United States Patent
Loh

(10) Patent No.: US 7,022,370 B2
(45) Date of Patent: Apr. 4, 2006

(54) METHOD FOR PREPARING IMPROVED SOYBEAN PRODUCTS

(75) Inventor: Jim Bay Loh, Green Oaks, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 245 days.

(21) Appl. No.: 10/154,862

(22) Filed: May 24, 2002

(65) Prior Publication Data

US 2003/0219526 A1 Nov. 27, 2003

(51) Int. Cl.
*A23L 1/20* (2006.01)

(52) U.S. Cl. ............... 426/634; 426/431; 426/489; 426/495

(58) Field of Classification Search ............... 426/634, 426/431, 489, 495
See application file for complete search history.

(56) References Cited

U.S. PATENT DOCUMENTS

| | | | |
|---|---|---|---|
| 4,039,696 A * | 8/1977 | Marquardt et al. ......... | 426/598 |
| 4,137,339 A | 1/1979 | Kudo et al. | |
| 4,296,026 A | 10/1981 | Millar | |
| 4,874,630 A | 10/1989 | Sengoku et al. | |
| 5,609,898 A | 3/1997 | Kaji et al. | |
| 5,858,449 A * | 1/1999 | Crank et al. ............... | 426/656 |
| 5,936,069 A * | 8/1999 | Johnson ..................... | 530/378 |
| 6,042,851 A | 3/2000 | Matsuura et al. | |
| 6,096,343 A | 8/2000 | Gergely et al. | |
| 6,566,134 B1 * | 5/2003 | Bringe ....................... | 435/410 |

* cited by examiner

*Primary Examiner*—Anthony Weier
(74) *Attorney, Agent, or Firm*—Fitch, Even, Tabin & Flannery

(57) ABSTRACT

A method is provided for producing an improved soybean product for use in food applications. The process enables the efficient denaturation of undesirable soy enzymes and removal of oligosaccharides from soybeans, preferably whole soybeans, without the development of off-flavors. The general method comprises: (1) heating an aqueous solution of a water soluble calcium salt to at least about 65° C. to provide a heated salt solution; (2) mixing soybeans with the heated salt solution to form a mixture; (3) heating the mixture for a time and at a temperature effective for deactivating protease inhibitors and lipoxygenase and removing oligosaccharides from the soybeans; (4) removing the aqueous solution from the mixture after the heating step; and (5) collecting the improved soybean product. The improved soybean product may be further processed for use in various food applications.

14 Claims, 1 Drawing Sheet

METHOD FOR PREPARING IMPROVED SOYBEAN PRODUCTS

FIELD OF THE INVENTION

The present invention relates generally to a method of preparing soybeans for use in food applications. The process enables the rapid and efficient deactivation of soy enzymes without the development of off-flavors and the rapid and efficient removal of undesirable oligosaccharides from whole soybeans to provide a soybean material having an improved nutritional profile. After initial processing, soybeans may be further processed for use in various food applications.

BACKGROUND OF THE INVENTION

The health benefits of soybeans have been known for some time. For centuries, soybeans have been the primary source of protein in Asian countries, and in recent years the popularity of soy-based products has increased in the United States. Along with a tendency to lower cholesterol levels, soybeans have recently been linked with, or suggested as having, a possible role in inhibiting cancerous or tumor cells. Additionally, soy protein contains an amino acid profile that is among the most complete of all vegetable protein sources, and resembles, with the exception of the sulfur-containing amino acids, the pattern derived from high-quality animal protein sources. Thus, efforts have been made to incorporate soy into a wide variety of foods.

In order for the maximum nutritional value to be realized from soy protein, inhibitors of proteolytic enzymes such as the trypsin inhibitor must be deactivated, typically by heat treatment. Oligosaccharides, which are also found in soybeans, may cause flatulence, if the level of soy protein ingested is sufficiently high. The flatulence is generally attributed to the fact that humans do not possess the enzyme a-galactosidase, necessary for hydrolyzing the $\alpha$-galactodidic linkages found in oligosaccharides to yield readily absorbable sugars. It is therefore desirable to remove the oligosaccharides from soybeans prior to their incorporation in foodstuffs.

Prior attempts have been made to process soybeans to deactivate enzymes and remove oligosaccharides. For example, U.S. Pat. No. 4,137,339 (Jan. 30, 1979) describes a method of preparing a processed food material from soybeans wherein whole soybean grains are soaked in water, heated to 80–200° C., and then crushed and homogenized prior to being treated with a protein coagulating agent to precipitate the soybean solids. Other processes have been used to remove oligosaccharides from soy milk (e.g., ultrafiltration and hydrolytic enzymes) and to deactivate soy enzymes (e.g., extrusion). The oligosaccharides remained in solution are were discarded with the supernatant liquid. Process such as these, while effective in deactivating enzymes and/or removing oligosaccharides, involve expensive equipment as well as many complicated and time-consuming steps; moreover, they are generally result in the development of off-flavors and the loss of valuable soy solids. Such processes generally require hydration and/or disrupting the cellular structure of the soybeans prior to the enzyme deactivation, typically by thermal treatment alone; this generally results in the formation of off-flavor precursors. Dry heat and/or roasting can also be used to deactivate the enzymes. Generally, however, these processes significantly and adversely alter the characteristics of the soybeans (i.d., flavor and/or color). Additionally, since such methods generally require that the soybeans be crushed in order to deactivate enzymes and remove oligosaccharides, the resulting products cannot be utilized for applications requiring the use of whole soybeans.

It is therefore desirable to provide a process for deactivating inhibitors of proteolytic enzymes (such as trypsin inhibitor (TI)) and flavor degrading enzymes (such as lipoxygenase) and removing oligosaccharides which is simple and efficient and which avoids the development of off-flavors. It is also desirable that such a process can be operated in a manner in which the integrity of the soybeans is maintained; in other words, it is desirable that the process can, if desired, provide such soybeans in the form of whole soybeans.

SUMMARY OF THE INVENTION

The present invention provides a simplified, low-cost method to prepare soybeans for use in a wide variety of food applications. The method provides in situ deactivation of enzymes, including trypsin inhibitor, in the treated soybeans and removal of oligosaccharides from the treated soybeans without the development of off-flavors or other undesirable characteristics. Generally, the process of the present invention also improves the overall nutritional profile of the treated soybeans relative to the original soybeans. The treated beans may then be further processed or used directly in food applications. Preferably, soybeans used directly in food applications are in the form of whole soybeans.

The method of the current invention provides several benefits over prior methods of processing soybeans for food applications. Significantly, the method of the current invention provides a means for efficiently extracting/deactivating undesirable compounds found in soybeans by means of a simple one-step process wherein the integrity of the soybeans can be maintained. Additionally, the process of the current invention results in virtually no loss in the yield of soybeans. Traditional processes which require crushing soybeans to deactivate enzymes and remove oligosaccharides have a significantly lower yield, as substantial levels of desirable soy solids are lost during processing. Moreover, the rapid processing of the method of the current invention minimizes the chances for developing off-flavors, since enzymes are deactivated in situ and, thus, do not have significant contact with soy materials or components. In traditional soy processing where the soybeans are soaked in water prior to heating, water activates the enzymes and causes undesirable off-flavors such as "beany," "cooked cereal," and oxidized notes. Such off-flavors are avoided or minimized in the present process. Additionally, the traditional process generally provides soybeans having an undesirable greyish color. The rapid processing and preservation of the whole bean in the present process allows soybeans to retain their natural golden-yellow color and, therefore provide a more desirable product.

The present method includes heating an aqueous solution of a water soluble calcium salt to about 65 to about 100° C., mixing soybeans with the heated calcium salt solution, and heating the mixture for a time and temperature which is effective for enzyme deactivation in the soybeans and rendering the proteins in the soybeans insoluble in water. During the heating step, the time and temperature should be at least sufficient to take the beans to a point where they cease swelling. Generally, this is done by heating the bean aqueous salt solution mixture at about 65 to about 100° C. for about 0.5 to about 2 hours (and preferably at about 90 to about 100° C. for about 0.5 to 1 hour). Preferably, dry soybeans are plunged into the hot calcium salt solution and then the solution heated to maintain the temperature at the desired level. The calcium salt solution then is removed and the treated soybeans collected. If desired, the treated soybeans may be washed with water to reduce the levels of calcium salts and/or other components. During heat treatment in the calcium salt solution, the oligosaccharides are leached from the soybeans and remain dissolved in solution when the calcium salt solution is removed from the mixture. Generally, the present process is effective for treatment of whole soybeans, broken or fractured soybeans, or soybean grits. Preferably, however, it is preferred that dehulled, whole soybeans are used in the present process.

Although not wishing to be limited by theory, enzyme deactivation in the soybeans appears to occur via the exposure to heat and calcium. Again, although not wishing to be limited by theory, it appears the calcium also immobilizes soy proteins rendering them insoluble, thereby preventing the loss of desirable soy solids during processing. Thus, the combination of heating and calcium appears to effectively denature and immobilize soy proteins and deactivate the soy enzymes, including trypsin inhibitor and lipoxygenase, in their native, undisturbed cellular structure. By preventing the release of enzymes and their respective substrates trapped in sub-cellular structure, the enzymatic reactions can be minimized (and perhaps even eliminated). Rapid deactivation of lipoxygenase effectively prevents the formation of off-flavor precursors. Thus, the flavor reversion problem commonly associated with dry soy ingredients such as soybean oil, soy flour, and soy protein concentrate is significantly reduced and, in some cases, eliminated. Cooking the beans in hot calcium solution and subsequent soaking allows the water soluble oligosaccharides to be removed with cooking media and soaking water.

The process of the current invention results in the deactivation of at least about 80 percent, preferably at least about 90 percent, and most preferably at least about 99 percent, of the enzymes, and removal of at least about 70 percent, and preferably about 85 to about 99 percent, of oligosaccharides. In an important aspect, the beans are heated in the calcium salt solution without prior soaking in water. Generally, the concentration of calcium salt in the solution is from about 0.1 to about 1 percent, and preferably about 0.2 to about 0.5 percent. While higher salt concentrations may be used, results do not appear to sufficiently improve with the use of higher salt levels. The ratio of salt solution to soybeans is generally at least about 3:1, preferably is about 4:1 to about 10:1, and more preferably about 4:1 to about 6:1.

In one embodiment, the present invention relates to a method for preparing an improved soybean product for use in food applications, said method comprising: (1) heating an aqueous solution of a water soluble calcium salt to at least about 65° C. to provide a heated salt solution; (2) mixing soybeans with the heated salt solution to form a mixture; (3) heating the mixture for a time and at a temperature effective for deactivating protease inhibitors and removing oligosaccharides from the soybeans; (4) removing the aqueous solution from the mixture after the heating step to provide the improved soybean product; and (5) collecting the improved soybean product. Preferably, soybean product from step (4) is rinsed and/or washed with water prior to collection in order to further remove excess calcium salt. Even more preferably, such rinsing and/or washing is carried out at a temperature of about 20 to about 90° C. for about 1 to 2 hours.

In another embodiment, the present invention relates to a method for preparing an improved whole soybean product for use in food applications, said method comprising: (1) heating an aqueous solution containing a water soluble salt to provide a heated solution, wherein the water soluble salt is effective for deactivating protease inhibitors and removing oligosaccharides from soybeans to a temperature effective to produce said deactivation and removal; (2) mixing dehulled, whole soybeans with the heated solution to form a mixture; (3) heating the mixture to a temperature and for a time effective to deactivate protease inhibitors and remove oligosaccharides from the dehulled, whole soybeans; (4) removing the aqueous solution from the mixture after heating step (3) to form the improved whole soybean product; and (5) collecting the improved whole soybean product. Preferably, soybean product from step (4) is rinsed and/or washed with water prior to collection in order to further remove excess calcium salt. Even more preferably, such rinsing-and/or washing is carried out at a temperature of about 20 to about 90° C. for about 1 to 2 hours.

In still another embodiment, the present invention relates to a method for preparing an improved whole soybean product for use in food applications, said method comprising: (1) heating an aqueous solution of a water soluble calcium salt to a temperature of at least about 65° C. to provide heated solution, wherein the aqueous solution contains about 0.1 to about 1 percent of the water soluble salt; (2) mixing dehulled, whole soybeans with the heated solution to form a mixture, wherein the ratio of the aqueous solution to dehulled, whole soybeans is at least about 3:1 in the mixture; (3) heating the mixture at a temperature of about 90 to about 100° C. for about 30 to about 60 minutes to deactivate protease inhibitors and remove oligosaccharides from the dehulled, whole soybeans; (4) removing the aqueous solution from the mixture after heating step (3) to provide the improved whole soybean product; and (5) collecting the improved whole soybean product. Preferably, whole soybean product from step (4) is rinsed and/or washed with water prior to collection in order to further remove excess calcium salt. Even more preferably, such rinsing and/or washing is carried out at a temperature of about 20 to about 90° C. for about 1 to 2 hours.

The present invention also relates to an improved soybean product prepared from soybeans containing protease enzymes and oligosaccharides wherein the improved soybean product has at least at least about 80 percent of the protease enzymes deactivated and at least about 70 percent of oligosaccharides removed relative to the soybeans and wherein the improved soybean product has essentially no off-flavors.

DETAILED DESCRIPTION OF THE INVENTION

Figure 1:
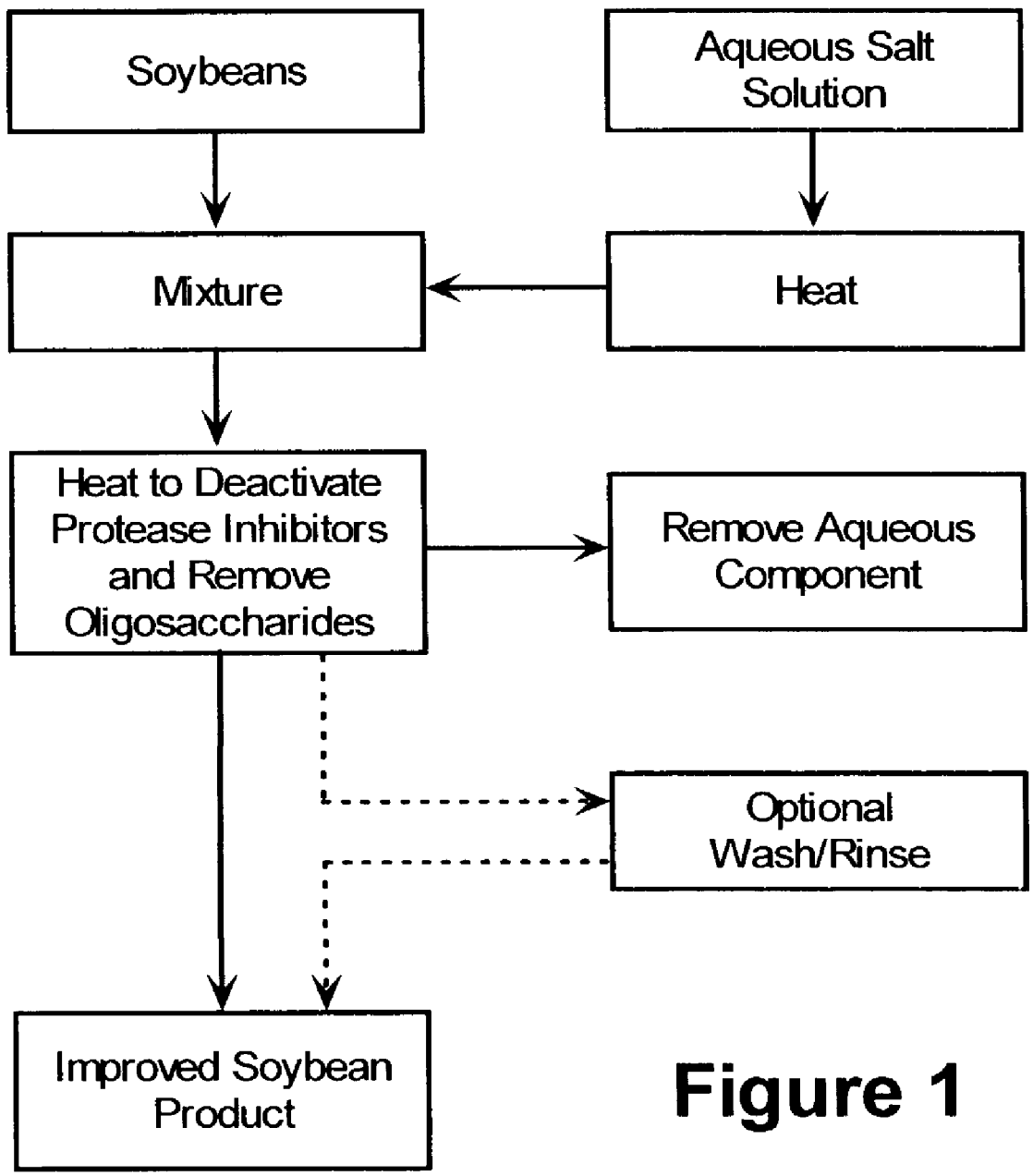
FIG. 1 provides a flowchart illustrating the general process of this invention.

The method of the current invention provides for the efficient in situ removal of oligosaccharides and the deactivation of enzymes, including the trypsin inhibitor. The method is carried out by treating soybeans (preferably whole, dehulled soybeans) with a water soluble salt solution (preferably a water soluble calcium salt) in an aqueous solution at about 65 to about 100° C. for about 0.5 to about 2 hours, and preferably about 90 to about 100° C. for about 0.5 to about 1 hour. During the treatment step, the enzymes are denatured and thus deactivated. The deactivated enzymes cannot act on soy materials or components (e.g., lipids and the like) to produce off-flavors. The minimum temperature required for proper deactivation of enzymes is about 65° C. Approximately 30 minutes into the treatment step, the beans swell as they become engorged with the salt solution. The penetration of the salt and water into the beans during the treatment step effectively leaches the oligosaccharides out of the beans and facilitates their removal. The oligosaccharides remain dissolved in the salt solution and can be removed when the soybeans are collected. The salt solution allows selectively removal of the oligosaccharides and renders the soy protein insoluble. Using this process, the whole bean can remain intact.

The types of salt suitable for carrying out the current invention are food grade salts which are effective for deactivating enzymes in the soybeans and rendering the proteins in the soybeans insoluble in water. Such salts include, for example, calcium sulfate, calcium chloride, calcium carbonate, calcium lactate, calcium gluconate, calcium citrate, and the like. In a preferred embodiment of the invention, an aqueous solution of calcium sulfate is used. The preparation of the salt solution utilized in the method of the current invention is carried out by dissolving the salt in water at a temperature of about 65 to about 100° C. using conventional methods known in the art. Ideally, the temperature of the water used to prepare the salt solution is at least 90° C. to enhance the solubility of the salt. The concentration of the resulting salt solution is generally about 0.1 to about 1 percent, preferably about 0.2 to about 0.5 percent. The ratio of salt solution to soybeans is generally about 3:1 or higher, preferably about 4:1 to about 10:1, and most preferably about 4:1 to about 6:1. As noted above, higher salt concentrations can be used if desired; they, however, generally do not provide additional benefits.

Many traditional processes for preparing soybeans require initially soaking the soybeans in water for about 1 to about 8 hours at a temperature of about 5 to about 40° C. prior to further processing. During such soaking, soy enzymes such as lipoxygenase are activated, thereby imparting off-flavors generally described in the art as "beany," "oxidized," and "cooked cereal" notes. While the production of such strong flavors may be desirable in Eastern applications using soy, Western cultures generally prefer a soybean product free of these flavors. Therefore, in an important aspect of the method of the current invention, the soybeans are not soaked in water prior to exposure to the heated aqueous salt solution. The heated aqueous salt solution, at a temperature of at least about 65° C., and preferably at least 90° C., quickly inactivates the enzymes present in the soybeans and prevents the formation of significant off-flavors. Preferably, dry soybeans are plunged into the hot calcium salt solution and then the solution heated to maintain the temperature at the desired level.

One embodiment of the present invention is illustrated in FIG. 1. Soybeans are mixed with a heated aqueous salt solution (e.g., an aqueous solution containing about 0.5 percent calcium sulfate dihydrate (US Gypsum, IL) at about 100° C.). Preferably, the salt is a food-grade calcium salt including, but not limited to, calcium sulfate, calcium chloride, calcium carbonate, calcium lactate, calcium gluconate, calcium citrate, and mixtures thereof. Generally, about 1 part by weight of whole soybeans (dehulled whole beans preferred) to about 4 parts of vigorously boiling calcium solution are combined and then maintained at about 100° C. for about 15 minutes to about 1 hour, and preferably for about 30 to about 45 minutes. At the end of heat treatment, the calcium sulfate solution is drained from the mixture to obtain the improved soybean product. Preferably the resulting soybeans are rinsed and then soaked with fresh water to remove any residual free calcium and beany flavors and oligosaccharides. Generally, such soaking can be carried out at about 5 to about 90° C., preferably at about 10 to about 25° C. using a water to soy bean ratio of at least about 3 to 1, and preferably at least about 4 to 1, for about 0.1 to about 4 hours, and preferably about 1 to about 2 hours. Based on compositional data of inventive soybean product as compared to a control sample (see Example 1), it appears that for the treated soybean material: (1) there is no significant loss in protein, lipid, or vitamin E, (2) there is only a minor loss in fiber content, (3) there is essentially complete removal of undesirable oligosaccharides such as stachylose and raffinose, (4) there is essentially complete deactivation of trypsin inhibitor and lipoxygenase, and (5) at least about 25 percent retention of original isoflavone are retained (i.e., comparable levels to the isoflavone content in tofu). If the initial heat treatment is reduced to about 30 minutes and the optional soaking is carried out at about 25° C. water for about 2 hours, approximately 75 percent of the isoflavones can be retained with about a 3.5× increase in calcium content. Even under the most severe heat treatment conditions, a high yield (i.e., about 87 percent or higher) can generally be obtained; the loss in yield appears to be due to the loss of soluble sugars and ash.

Unlike conventional soybean processes (e.g., tofu preparation), the inventive process does not require hydration, pre-soaking, or comminuting of soybeans prior to the thermal deactivation of enzymes. Thus, the cellular and subcellular structure of the beans remain undisturbed during heat treatment thus leaving no chance for enzymes and their respective substrates to be activated, released or to react. Photomicrographs of untreated (i.e., control) and treated soybeans using the process of this invention demonstrate that essentially all sub-cellular components (e.g., protein bodies, oil glands) remains intact after treatment using the present process; no concentration gradients of calcium across the treated beans were detected. In fact, only slight elongation of cell wall structure was observed due to eventual hydration of the beans. Although not wishing to be limited by theory, calcium appears to help to prevent protein loss during the treatment. Additionally, preservation of the original cellular and sub-cellular structure of soybeans prior to and during thermal treatment is believed to be responsible for subsequent flavor stability.

The whole soybeans obtained by the process of this invention may be used directly or further processed for use in various food applications. The soybeans prepared by the method of the current invention may be further processed by common methods known in the art such as micromilling, puffing, drying, roasting, flaking, powdering, flavoring, and the like. For example, whole soybeans may be roasted and/or flavored for use as a whole soy nut product. Whole soybeans may be ground into a paste for use in salad dressings, sauces, spreads, soups, dips, desserts, beverages, and the like, or may be puffed or roasted for snack or ready-to-eat or other cereal applications. Whole soybeans treated by the process of the current invention may also be dried whole or processed into flakes or powders. Such treated whole soybeans may be dried, toasted, roasted, and/or flavored for use as a whole soy nut product. Flaked and/or powdered soybeans can be used conveniently as ingredient to be used in ready-to-eat cereals, snacks, baked goods, and the like for improved nutritional value.

The soybean compositions produced by the present invention generally have nutritional value similar to that of dried tofu and are higher in dietary fiber content. The health benefits of the internal fiber from soybean cotyledons are well known and include such physiological benefits as normalization of bowel function, lowering serum cholesterol levels, and reducing insulin response in humans. Furthermore, the treated beans are more than three times higher in calcium content than untreated beans; the calcium content of the present soybeans is comparable to the calcium content of cow milk on dry weight basis. Additionally, a significant amount of natural isoflavone is preserved in the soybeans produced by the present invention; isoflavone is generally considered to significantly contribute to the health benefits derived from soybeans.

The methods of the current invention provide several benefits over prior methods of processing soybeans for food applications. Significantly, the method of the current invention provides a means for efficiently extracting/deactivating undesirable compounds found in soybeans by means of simple one-step process (i.e., treatment with a heated aqueous salt solution). Additionally, a high yield of soybeans may be realized with the process of the current invention. The loss of proteins or lipids due to the present treatment is negligible and there is essentially no solid waste.

Traditional processes which require first soaking and grinding soybeans into slurry then extracting soy protein and lipid. The hydration of soybeans and mechanical disruption of cellular structure in these conventional processes are required for effective extraction. Such conventional processing methods inevitably activate and release flavor-deteriorating enzymes (e.g., lipoxygenase) as well as their substrates. Even if the comminuted soybean slurry is heated rapidly in attempt to deactivate lipoxygenase, a significant quantity of off-flavor precursors will have already been formed. These off-flavor precursors, which may be odor-less by themselves, will continue to oxidize and render finished food products containing such soy ingredients unacceptable. The present invention alters the traditional process sequence by deactivating enzymes in situ (without first hydration or disrupting cellular structure) with rapidly heating of soybeans in calcium solution which results in significantly reduced, and perhaps even in elimination, of these enzymatic reactions during the process. Moreover, since the undesirable soy oligosaccharides are highly water soluble, they will readily leach out of soybean cotyledon into the cooking/soaking media and can, therefore, be easily removed. In conventional soybean process, removal of such oligosaccharides generally results in significantly lower yields since substantial levels of desirable soy solids (e.g., proteins) are lost during processing. Finally, the rapid processing of the method of the current invention minimizes the chances for developing off-flavors.

Virtually any means of processing soybeans may be carried out utilizing soybeans that have been treated by the process of the current invention. Because the soybeans prepared by the method of the current invention contain denatured protein, they do not absorb significant amounts of water and thus will not significantly modify or increase the viscosity of liquid food products or ingredients in which they are used.

The following examples are intended to illustrate the invention and not to limit it. Unless otherwise stated, all percentages and ratios are by weight.

EXAMPLE 1

In a steam-jacketed kettle, 50 g of natural gypsum (calcium sulfate dihydrate from US Gypsum, IL) and 10 liters of water were heated to a vigorous boil at about 100° C. Cleaned, dehulled soybeans (2 Kg) were added all at once to heated gypsum solution with gently mixing. The mixture was quickly brought back to boiling within about 2 minutes and kept at 100° C. for 1 hour. The mixture was poured onto a strainer in order to separate the free liquid. The heated soybeans were briefly rinsed with hot tap water and soaked in hot water at about 60 to about 80° C. for about 1 hour. The yield loss was about 12.5 percent. After cooling, treated beans were analyzed for gross chemical composition and enzyme activity (i.e., trypsin inhibitor and lipoxygenase) and compared with untreated starting material (i.e., control). The following results were obtained:

|  | Control | Inventive |
| --- | --- | --- |
| Protein (%) | 43 | 50 |
| Fat (%) | 23 | 27 |
| Total Dietary Fiber (%) | 24 | 21 |
| Soluble Dietary Fiber (%) | 1.4 | 1.7 |
| Insoluble Dietary Fiber(%) | 22 | 19 |
| Ash (%) | 5.4 | 3.3 |
| Calcium (ppm) | 2,876 | 10,100 |
| Raffinose (%) | 1.4 | <0.1* |
| Stachyose (%) | 5.9 | <0.1* |
| Sucrose (%) | 5.1 | <0.1* |
| Fructose (%) | 0.5 | <0.1* |
| Vitamin E (IU/100 g) | 2.3 | 3.6 |
| Total Isoflavone (ug/g) | 834 | 205 |
| Total Daidzein (ug/g) | 319 | 55 |
| Total Genestein (ug/g) | 468 | 140 |
| Total Glycitein (ug/g) | 47 | 10 |
| Lipoxygenase (unit/g) | 967 | <5* |
| Trypsin Inhibitor (unit/g) | 70 | <2* |

*Not detectable; lower detection limit given.

The wet, treated beans were either air-dried or freeze-dried for further use. Air dried beans were ground in a lab grinder (Champ HP3, K-Tek, UT) to obtain a fine powder passing through #20 US screen. The resulting full-fat soybean powder was kept in sealed glass jar with at least 50 percent (by volume) headspace; it was periodically opened and checked for off-flavor by expert panel. No off-flavor was detected after 6 months under ambient storage conditions.

EXAMPLE 2

Dehulled, whole soybeans were treated as in Example 1 except that after the treated soybeans were separated from the free liquid, they were briefly rinsed with cold tap water and then soaked in 20° C. water for about 2 hours. No lipoxygenase activity was found in the treated beans. After adding water to the treated beans (ratio of about 3.7:1), the mixture was ground to form a coarse slurry using a lab blender (Champ HP3, K-Tek, UT) and then micromilled to form a smooth paste using a Dyno mill (2-pass). The micromilled soybeans was added to Ranch-type salad dressing up to 20 percent without any off-flavor. Improved flavor and tartness were also observed. The micromilled soybean product can be used as a fat mimetic,

EXAMPLE 3

A crunchy soy product similar to granola and free from undesirable soy oligosaccharides and beany off-flavor was prepared using dry, treated soybeans from Example 1. A binder syrup was prepared by mixing at 60° C. brown sugar (53%), water (28%), corn syrup (5%), fructose (6%), 10 DE maltodextrin (5%), and sweet whey (3%). 1 part of the dry, treated soybeans were mixed with 0.18 part of melted vegetable shortening, followed by further mixing in 0.53 part of warm (60° C.) binder syrup. The resulting mixture can be spread and compacted on a baking sheet and dried at 121° C. in a convection oven for about 40 minutes followed by cooling to 20° C. to form a crunchy soy granola-type bar. Each 40 g bar will contain more than log soy protein and, therefor, can be regarded as excellent source of protein.

EXAMPLE 4

Dehulled whole soybeans were heated in 0.5% calcium sulfate solution for 30 minutes at about 100° C. After draining off the cooking water, treated beans were soaked in 20° C. water (6× by weight to treated beans) for 2 hours. Soaked beans were either freeze dried or air dried. Dried, treated beans were kept in plastic bag and stored at ambient condition for five months. Three parts of molten chocolate mass at about 40° C. were manually mixed with two parts of freeze dried or roasted inventive whole beans in a bowl. The mixture was then divided to form clusters of about 30 g and allowed to cool to room temperature on a plastic sheet. The resulting chocolate-soy candy is comparable in taste and texture of similar product made of chocolate and peanuts. No objectionable off-flavor or beany taste were detected in the sample containing inventive soybeans. Each 30 g cluster contains more than 6.25 grams of soy protein thus can be considered as "Good Source of Soy Protein" according to current FDA health claim guidelines.

What is claimed is:

1. A method for preparing an improved whole soybean product for use in food applications, said method comprising:
   (1) heating an aqueous solution containing a water soluble salt to provide a heated solution, wherein the water soluble salt is effective for deactivating protease inhibitors and lipoxygenase and removing oligosaccharides from soybeans to a temperature effective to produce said deactivation and removal;
   (2) mixing dehulled, whole soybeans with the heated solution to form a mixture;
   (3) heating the mixture to a temperature and for a time effective to deactivate protease inhibitors and lipoxygenase and remove oligosaccharides from the dehulled, whole soybeans;
   (4) removing the aqueous solution from the mixture after heating step (3) to provide the improved whole soybean product; and
   (5) collecting the improved whole soybean product.

2. The method of claim 1, wherein the improved whole soybean product of step (4) is rinsed with, or soaked in, water.

3. The method of claim 1, wherein the water soluble salt is selected from the group consisting of calcium sulfate, calcium chloride, calcium carbonate, calcium lactate, calcium gluconate, calcium citrate, and mixtures thereof.

4. The method of claim 3, wherein the water soluble salt is calcium sulfate.

5. The method of claim 3, wherein the ratio of the aqueous solution to the dehulled, whole soybeans is at least about 3:1 in the mixture.

6. The method of claim 4, wherein the ratio of the aqueous solution to the dehulled, whole soybeans is at least about 3:1 in the mixture.

7. The method of claim 5, wherein the aqueous solution contains about 0.1 to about 1 percent of the water soluble salt.

8. The method of claim 6, wherein the aqueous solution contains about 0.1 to about 1 percent of the water soluble salt.

9. The method of claim 7, wherein the heating step (3) is carried out at a temperature of about 90 to about 100° C. for about 30 to about 60 minutes.

10. The method of claim 8, wherein the heating step (3) is carried out at a temperature of about 90 to about 100° C. for about 30 to about 60 minutes.

11. A method for preparing an improved whole soybean product for use in food applications, said method comprising:
   (1) heating an aqueous solution of a water soluble calcium salt to a temperature of at least about 65° C. to provide heated solution, wherein the aqueous solution contains about 0.1 to about 1 percent of the water soluble salt;
   (2) mixing dehulled, whole soybeans with the heated solution to form a mixture, wherein the ratio of the aqueous solution to dehulled, whole soybeans is about 4:1 to about 10:1 in the mixture;
   (3) heating the mixture at a temperature about 90 to about 100° C. for about 30 to about 60 minutes to deactivate protease inhibitors and lipoxygenase and remove oligosaccharides from the dehulled, whole soybeans;
   (4) removing the aqueous solution from the mixture after heating step (3) to provide the improved whole soybean product; and
   (5) collecting the improved whole soybean product.

12. The method of claim 11, wherein the water soluble calcium salt is selected from the group consisting of calcium sulfate, calcium chloride, calcium carbonate, calcium lactate, calcium gluconate, calcium citrate, and mixtures thereof.

13. The method of claim 11, wherein the improved whole soybean product is further processed using a process selected from the group consisting of micromilling, puffing, drying, roasting, flaking, powdering, and flavoring.

14. The method of claim 12, wherein the improved whole soybean product is further processed using a process selected from the group consisting of micromilling, puffing, drying, roasting, flaking, powdering, and flavoring.

* * * * *